Figure 1:
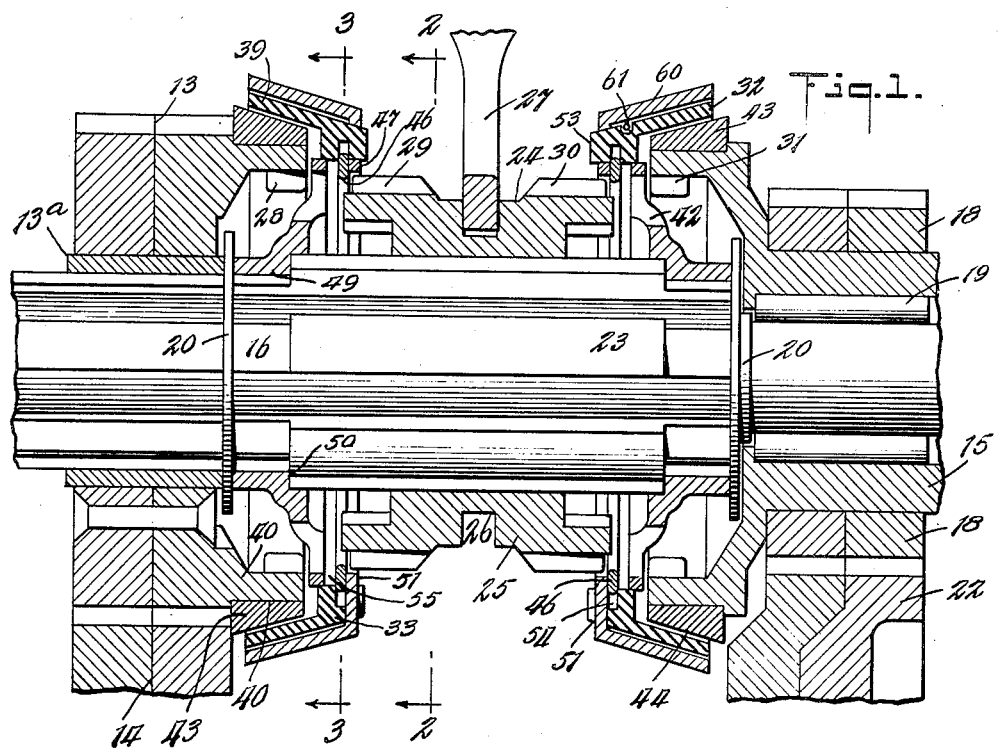

Aug. 29, 1933.  H. J. MURRAY  1,924,875
SHROUDED SYNCHRONIZER
Filed Oct. 12, 1931  2 Sheets-Sheet 1

INVENTOR
HOWARD J. MURRAY
BY
Warren S. Orton
ATTORNEY

Aug. 29, 1933.                H. J. MURRAY                1,924,875
                          SHROUDED SYNCHRONIZER
                          Filed Oct. 12, 1931         2 Sheets-Sheet 2

INVENTOR
HOWARD J. MURRAY
BY
*Warren S Orton*
ATTORNEY

Patented Aug. 29, 1933

1,924,875

UNITED STATES PATENT OFFICE 1,924,875

SHROUDED SYNCHRONIZER

Howard J. Murray, New York, N. Y., assignor to R. M. Company, Inc., East Pittsburgh, Pa., a corporation of Delaware Application October 12, 1931. Serial No. 568,261

25 Claims. (Cl. 192—53)

The invention relates to a synchronizing device of the type wherein a shaft and a coaxially disposed gear are organized to approach the same speed before they are connected through a positive clutch form of connector, and the invention in the form herein selected for illustration relates to a constant mesh transmission mechanism of the type commonly used in automotive power transmission devices for effecting a direct drive and a second speed drive between the engine shaft and the propeller shaft. The invention herein disclosed constitutes an improvement and development of the invention disclosed in my copending application entitled "Synchronizing device", Serial No. 331,944, filed January 11, 1929.

In devices of this character it is a usual construction to synchronize the parts which are to be positively connected through the medium of a friction clutch, which includes a shiftable element usually turning in oil or other lubricating medium. The medium in which these synchronizing shiftable friction clutch elements turn is very apt to impose a resistance or drag on their desired freedom of rotary movement which either affects their operation, or, in those cases where the shiftable element is caused to be moved into its clutching position by relative rotary movement between the clutch elements, as was the case in the structure illustrated in the companion application, any drag is apt to cause a premature or otherwise undesirable actuation of the synchronizing device.

Accordingly, the primary object of the present invention is to provide a synchronizing device of the type outlined which will be free of any objectionable action which might otherwise be imposed on the same by the drag of the lubricant in which it is turning.

Broadly, this object is attained by shielding the shiftable synchronizing clutch element in such way as will minimize, if not eliminate, any undesirable action thereon by its presence in the oil or lubricant in which it turns.

In the device disclosed in the above identified application the synchronizing clutch element is moved by manual or similar control action into an initial clutching engagement with the coacting clutch element, and in its initial tendency to be turned thereby there is brought into operation a camming device reacting on the clutch element in such way as to increase the intensity of its initial clutching engagement with a force proportionate to the difference in momentum between the parts to be synchronized. In the preceding form of construction the camming action took place between the shaft on which the shiftable synchronizing clutch element was mounted and the clutch element itself, with the result that the shiftable element necessarily has to be made of some material size in order to provide the necessary structural strength to reach from the shaft to the clutching part of this element. Any massive member necessarily possesses a high torque force when rotating, especially at the high speed at which devices of this character operate when utilized as part of a change-speed gear transmission, and time must be consumed in waiting for such massive members to lose their momentum, which is highly disadvantageous in situations where the movement of the clutches to and from their clutching positions must be done quickly. Where it is desired, for instance, to synchronize first one gear set and then quickly thereafter to synchronize another gear set, as when shifting from neutral to reverse and then to first speed, it is desirable to have the first synchronizing device entirely inoperative and idling, and this, of course, is difficult where the synchronizing action continues due to the time delay necessary for the high speed and high torque turning members to lose their speed.

Another object of the invention is to provide a synchronizing device of the type outlined which will provide the requisite extensive area of clutching engagement and at the same time will be of relatively small mass so as to possess low momentum when driving even at high speed, and which will tend quickly to lose its speed and thus become inoperative in a short space of time.

Accordingly, the present disclosure features a form of shiftable synchronizing friction clutch element which will have substantially no more mass than is necessary to provide the requisite clutching surface and camming features.

In the device disclosed in the preceding application where the synchronizing actuating camming device was formed in part on the shaft and in part on the relatively long massive hub necessary to support the clutch element, the camming parts had to be made sufficiently rugged to transmit the torque forces therethrough. In the present disclosure, where the synchronizer is simply a light metal ring having a large internal diameter, the driving pressure per unit area on the camming device is relatively small and therefore the parts which form the camming device need not be rugged or massive, here again reducing massiveness of the synchronizer.

Accordingly, another object of the invention is to provide a cam actuated friction clutch synchronizer which can function efficiently and which, as the part containing the synchronizing device need transmit only relatively small torque forces per unit surface of cam surface engaged, need not have the structural strength and thus the bulk necessary with prior devices.

It is exceedingly difficult as a manufacturing proposition to insure the proper fit between the friction clutch elements when its component parts are separately mounted in position on an automotive transmission mechanism.

Accordingly, the present invention has for another object the providing of a synchronizing friction clutch, the parts of which can be pre-assembled as a unit with the parts in proper relative position and arranged so that the unit as a whole may be installed in position on the transmission with assurance that the pre-set relation of the clutching elements will be maintained independent of variations in the parts on which it is mounted.

Still another object of the invention is to provide a device designed to be provided with a plurality of accurately related camming portions.

Various other objects and advantages of the invention will be in part obvious from an inspection of the accompanying drawings, and in part will be more fully set forth in the particular description of one form of mechanism embodying the invention, and the invention also consists in certain new and novel features of construction and combination of parts hereinafter set forth and claimed.

Figure 2:
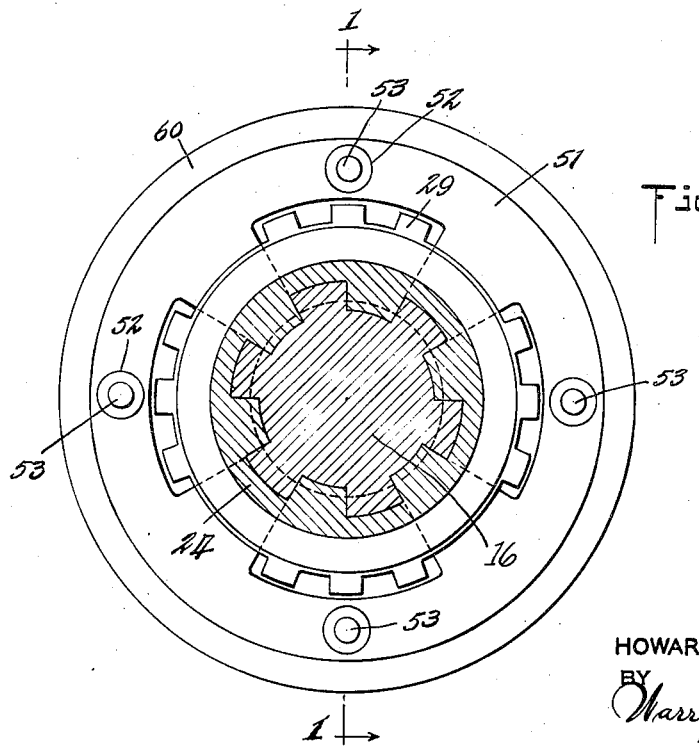
Figure 4:
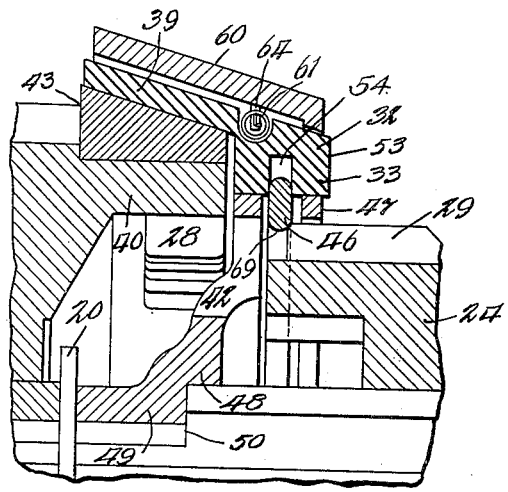
Figure 5:
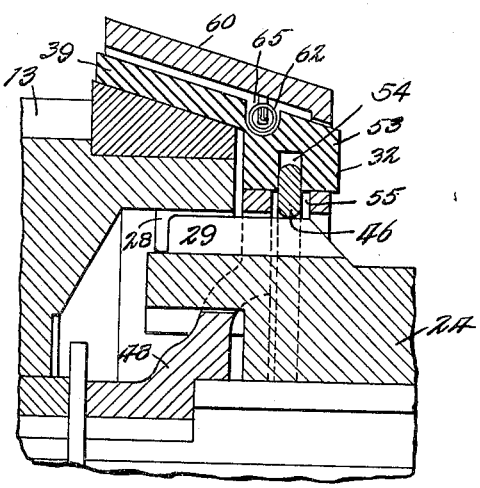
Figure 3:
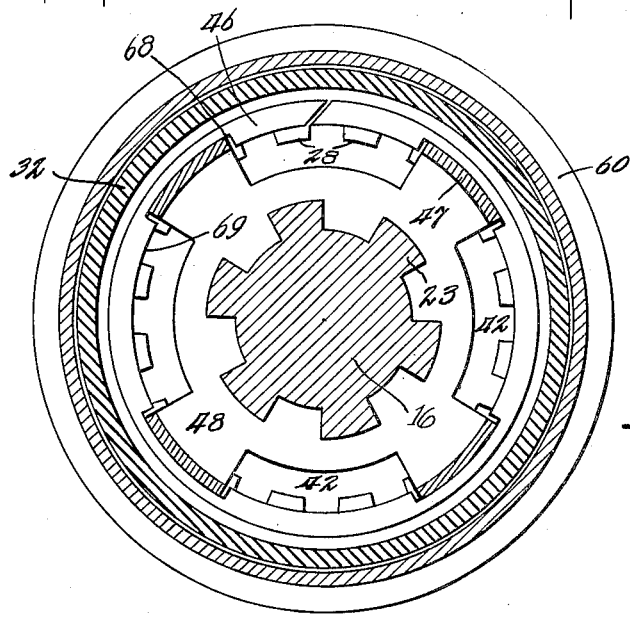
Figure 6:
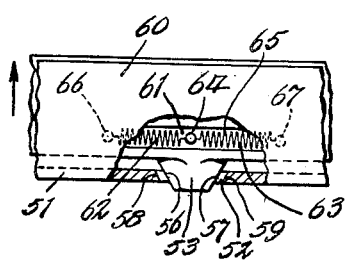

In the accompanying drawings:

Fig. 1 is a view in axial section of part of a change speed automotive power transmission mechanism showing a preferred embodiment of the invention installed therein, taken on the line 1—1 of Fig. 2 looking in the direction indicated by the arrows, and with the parts shown in their normal neutral inoperative position;

Figs. 2 and 3 are each transverse sectional views taken respectively on the lines 2—2 and 3—3 of Fig. 1, looking in the direction indicated by the arrows;

Figures 4 and 5 are each enlarged vertical sectional views of the upper left-hand portion of the construction shown in Figure 1, Figure 4 showing the position of the parts with the friction clutch element shifted from the position shown in Fig. 1 into its clutching position and with the positive clutch elements still disengaged, and Fig. 5 showing the final position with the positive clutch in clutched position; and Fig. 6 is a fragmentary plan view of the top portion of the structure shown in Figs. 1, 4 and 5, with the parts of the shroud broken away to show the synchronizing friction clutch element and one of its operating cams.

In the drawings, and referring particularly to the showing in Fig. 1, there is disclosed part of a transmission including an engine shaft 15 formed to receive a main power gear 18 in mesh with a jack shaft driving gear 22 mounted on a jack shaft (not shown). Disposed in axial alignment with the shaft 15 is a propeller shaft 16, a reduced end of which is rotatably mounted on elements 19 and contained within a recessed end of the engine shaft. Loosely mounted on the shaft 16 is a second speed gear 13 mounted on bushing 13A and held in place against longitudinal shifting by means of stop plates, one of which is shown at 20. The gear 13 meshes with a gear 14 also carried on and secured to the jack shaft. The portion of the shaft 16 between gears 13 and 18 is provided with splines 23, six being shown in Figs. 2 and 3, and on this portion of the shaft is splined an axially slidable control member 24. This member includes a rugged central ring 25 provided with a peripheral slot 26 in which rides a manually actuated shift finger 27 by means of which the member 24 as a whole is slid conventionally, for instance, to the left from the neutral position shown in Fig. 1 to effect a second speed drive between the shafts 11 and 15, or to the right from the position shown in Fig. 1 through the position shown in Fig. 4 and into the position shown in Fig. 5 to effect a first speed drive from shaft 15 through gear like teeth 31, slide member 24, to shaft 16. It is understood that the construction thus far described is conventional and the showing is intended to represent the installation of the invention featured herein in connection with any form of automotive power transmission now in general use.

For the purpose of clutching the engine shaft 15 to the propeller shaft 16, the gear 13 is provided with sets of teeth 28 forming an internal mutilated gear set or female clutch element adapted to be engaged by similarly formed and spaced sets of prongs or teeth 29 formed on the adjacent end of the member 24 and designed to coact with the teeth 28 to provide a positive clutching engagement between the member 24 splined to the shaft 16 and the power member 13. Similarly, the opposite end of the shift member 24, beyond the central ring 25, is provided with teeth 30 which engage teeth 31 on the adjacent side of shaft 15 to provide a similar positive clutching engagement between slide member 24 splined to the shaft 16 and the gear 18. The teeth 29 and 30 are each arranged in circumferentially spaced apart sets, three teeth are in each set of teeth 29 on the member 24, and four teeth are in each set of the teeth 28—31 on the gear 13 and shaft 15.

Positioned between the shaft 16 and the gears 13 and 18 is a pair of synchronizing devices operatively connected to cause gear 13 and shaft 16 to approach the same speed as the shift fork 27 is moved to the left from the neutral position shown in Fig. 1, and when shifted in the opposite direction will cause gear 18 and shaft 16 to approach the same speed relation. As these synchronizing devices are of similar construction, except for obvious reversal in parts, the detailed description of one will be sufficient for the other.

The synchonizing device includes a relatively light ring-shaped member 32, hereinafter referred to as a synchronizer, and which includes a long rugged hub mounted to have a limited freedom of axial and rotary movement on an axially extending bearing ring portion 47 of a mounting ring 48. The portion of the synchronizer 32 beyond its hub 33 forms a thin flange 39 which overlaps a ring-like extension 40 which projects from the adjacent face of the associated gear 13 or shaft 15. The flange forms the female element of a friction clutch of the cone type, and, while intended to provide a friction clutch with an extensive area of frictional engagement, it is designed to have small mass and thus to possess small momentum, and capable of being easily braked even though it be rotating at high speed. The mounting ring has a long hub 49 secured to the shaft 16 between stop ring 20 and shoulders 50 formed on a reduced portion of the splined part of the shaft 16. The portion of the mounting ring between its hub 49 and the bearing ring portion 47 extends outwardly of the shaft 16, and is provided with four openings 42 extending therethrough and facing the internal teeth 28 or 31 of the associated power gear 13 and shaft 15. The portion of the ring exteriorly of the bearing ring portion 47 and exteriorly of the path of movement of the shift member 24, constitutes a camming wall 51 provided with four circumferentially and equally spaced apart relatively small circular camming slots 52.

The hub portion 33 of the synchronizer is provided with conical projections 53 forming cams, one for each of the camming openings 52 and projecting therethrough as shown at the upper side of Figs. 4 and 5 and in plan in Fig. 6.

The side of the synchronizer hub which faces the camming wall 51 is provided with a shouldered recess and coacts with the wall to form a recess 54 for receiving the outer peripheral portion of a split deterrent spring 46 having recessed portions 68 normally disposed to rest on portions of the bearing 47 as shown in Fig. 3, and with its inner unrecessed peripheral portion 69 in the path of axial movement of the teeth 29 or 30, as the case may be, and which teeth pass beyond the ring 46 and through the openings 42 in their engagement with the associated gear teeth.

The deterrent spring is contained in a recess 55 in the ring portion 47 of the carrying ring, and this recess is of slightly greater length measured axially of the shaft 15 than the thickness of the ring, as is particularly shown in Figs. 1, 4 and 5, so that the ring has a slight freedom of axial movement on the bearing 47 as it shifts with the synchronizer to and from its positive clutching position.

As the camming slots 52 are slightly longer, considered circumferentially, than the cams 53 which project into and through the same, it is seen that the synchronizer may have a slight freedom of circumferential movement relative to the mounting ring 48 and thus relative to its carrying shaft 16, or may be seated when shifted in either direction from the position shown in Fig. 6. As the projections 53 are conical they have opposite sides beveled relative to the plane of rotation of the mounting ring, as shown at 56 and 57 in Fig. 6, and are adapted to coact respectively with the correspondingly beveled ends 58 or 59 of the camming slots 52 to cause the synchronizer 32 to be moved forcibly into an intense clutching engagement under the camming action of 58 or 59 bearing on 56 or 57, or the reverse.

Beyond the camming wall 51 the synchronizer mounting ring terminates in a synchronizer protecting ring or shroud 60 which extends to the outside of, and is closely positioned to, the synchronizer flange 39 to eliminate, or at least to minimize, oil drag on the movable element of the synchronizer. From this construction it is seen that the only portions of the synchronizer which are exposed to the oil drag are the small camming projections 53, and thus the light weight synchronizer is not materially influenced by the resistance to rotary movement which may be imposed on the synchronizer when turning in oil or in the heavy lubricant usually contained in transmission casings.

In order to restore the synchronizer 32 to its normal inoperative unclutched position as shown in Fig. 1, and in order to space the cams 53 in position centered in their respective slots 52, one or more centering devices 61 is employed between the synchronizer and the shroud forming part of the mounting ring. Each centering device, four of which are used in the form illustrated, consists of a pair of centering springs 62 and 63 (see Fig. 6) extending in alignment circumferentially with their adjacent ends secured to a centering pin 64 depending from the shroud forming flange 60 and positioned in a recess 65 in the outer periphery of the synchronizer. The outer ends of the springs are secured to the synchronizer by means of pins 66 and 67.

In operation, and assuming that the shafts 16 and 15 have relative movement and that it is desired to effect a second speed drive between the shafts 16 and 15, the shift fork 27 is moved to the left from the position shown in Fig. 1. The initial movement of the sliding member 24 causes its advanced end to bear against the deterrent spring 46 and to act therethrough to shift the synchronizer 32 from its normal inoperative position shown in Fig. 1 into its operative friction clutching position shown in Fig. 4. At this time the shaft 15 acting through the jack shaft gears will tend to overrun the shaft 16, or the reverse. In this case cams 53 will be shifted to the right or left from the position shown in Fig. 6 and into engagement with either the cam faces 58 or 59, depending upon the relative rotary relations of the synchronizer and the camming ring 48. The angular disposition of the cam relative to its coacting cam surface on the camming ring will coact against the synchronizer to shift the same in the direction indicated by the arrow in Fig. 6 to force the same more firmly into its clutching engagement with the gear 13, or rather into firmer engagement with the coacting friction clutch element 43 secured to the gear 13. It is obviously within the scope of this disclosure, however, to omit the cam action simply by omitting the cams 53 and to effect the frictional clutching engagement between the elements 39 and 43 solely from the manual efforts of the operator acting through the shift fork 27. In either case the shafts 16 and 15 are brought to the desired relative speed and a continued movement of the sliding member 24 to the left from the position shown in Fig. 4 into the position shown in Fig. 5 will permit the sets of external or clutch teeth 29 to pass through the openings 42 into direct positive clutching engagement with the internal teeth 28, thus completing the positive clutching engagement between the shafts 16 and 15 through the slide member 24 and gear 13, gear 14, jack shaft (not shown), gear 22, and gear 18.

When it is desired to disengage the parts the shift lever 27 is moved conventionally to the right and back into neutral position shown in Fig. 1. This permits the synchronizer to turn with the shaft, quite free from its clutching engagement with the male element. As soon as the synchronizer is freed of the tension of the slide member 24 the springs 62 and 63 are free to function and react on the synchronizer to shift the same circumferentially for the slight distance necessary to recenter the cams in their normal position in slots 52, as shown in Fig. 6, in the event that they are not already so centered.

It is understood that should it be desired to effect a direct drive through the mechanism, the shift fork 27 is similarly moved to the right and there is effected in sequence a movement of the slide member 24 from the position shown in Fig. 1 into engagement with the deterrent spring to shift the synchronizer manually into its initial clutching engagement with the corresponding clutch element 43 on shaft 15, thus causing gear 18 to turn at the same speed as shaft 16, after which the teeth 30 pass through the ring 46, through the openings 42, and into clutching engagement with the teeth 31, as has been previously described, for the second speed connection.

By means of the device herein disclosed there has been provided a form of construction which has all the advantages inherent in the construction disclosed in the above identified application. This device has the added advantage over the previous construction in that shroud 60 protects flange 39 at all times from any tendency which an oil drag thereon might otherwise have to accidentally rotate, or prevent the rotation of the synchronizer. There is the possibility that such accidental shifting would cause the camming device to function and thus cause the synchronizer to operate accidentally.

In the manufacture of the device disclosed, it is proposed to construct the mounting ring 49, the deterrent spring 46, and the shiftable element 32, as a pre-formed unit, and which unit is designed to be mounted in place simply by positioning hub 49 in proper location between the shoulder 50 and stop ring 20 on the transmission construction. In this way the parts which form the camming devices can be accurately machined, assembled, and pre-set in the machine shop, each unit fabricated with an assurance that when in position in any transmission the parts will function efficiently.

It is also appreciated that there is an advantage in spacing the camming device outwardly of the axis of rotation and as close as is possible to the outer periphery of the synchronizer in order to attain the advantages of a long leverage in distinction from the short leverage present where the synchronizer controlling cams are mounted directly on the shaft, as in the preceding device. Positioning the camming devices outwardly of the synchronizing construction and close to the portion of the synchronizing device which forms the clutching surface of the shiftable element, reduces the pressure per unit area which must be transmitted from the camming devices and thus permits the construction of the cams of less massive parts than would otherwise be necessary. In the construction herein disclosed, the hub portion which must have sufficient structural mass to provide the requisite length of bearing and to provide support for the friction flange 39, is utilized to form the cam, and in this way the cam is provided without necessity of adding material to the synchronizer particularly for this purpose. In this disclosure it is intended that the synchronizer be of the lightest possible weight so as to minimize the mass of parts of the friction clutch which has to be shifted at each actuation of the device.

Accordingly, the present disclosure constitutes an improvement over the showing in the companion case in that it is only the outer peripheral portion of the friction clutch element which is shifted, the inner hub portion in the instant case being designed to be secured to the shaft as a fixed part thereof.

I claim:

1. In a device of the class described, the combination of two rotative members adapted to be connected to drive one from the other, one of said members comprising a shaft and the other a power gear mounted for rotary movement about the axis of the shaft, said gear provided with teeth forming an internal gear constituting an element of a positive clutch and provided with a bevel surface constituting an element of a friction cone clutch, synchronizing means for causing the two members to approach the same speed before they are disposed in their interdriving relation through said positive clutch, said synchronizing means including a bearing ring-like portion encircling and spaced outwardly of the shaft, a synchronizer of relatively light mass mounted on said bearing ring portion provided with a bevel surface constituting the coacting element of the friction cone clutch, said bearing ring-like portion having a flange overlapping the synchronizer and constituting a shroud for protecting the synchronizer from the dragging effect of the oil or other lubricant in which the same may be embedded and said bearing portion having an opening extending therethrough adapted to face the internal gear teeth, and a shift member splined to the shaft to turn therewith and slidable longitudinally thereon to and from an operative engagement with the synchronizer and gear, means operable as an incident of the shifting of the shift member towards the synchronizer to cause the friction clutch to connect the shaft and power gear, said shift member provided with teeth forming an external gear constituting the coacting element of the positive clutch, the advanced portion of said external teeth adapted successively to shift the synchronizer axially into its friction clutching position and then pass through the opening to engage the internal gear teeth to interconnect the members following the functioning of said synchronizing means.

2. In a device of the class described, the combination of a shaft, a power gear loose on the shaft and having teeth forming part of a positive clutch and having a bevel face constituting an element of a conical friction clutch, synchronizing mechanism for causing the gear and shaft to approach the same speed, said mechanism including two concentric members adapted to be mounted on the shaft and comprising a mounting ring secured to the shaft to turn therewith, and a synchronizer mounted for rotary movement on the ring, said ring having in order outwardly of the shaft a hub splined to the shaft, an outwardly extending wall, a cylindrical periphery providing a bearing and a shroud, said synchronizer carried by said bearing, and provided with a flange constituting the coacting element of the conical friction clutch and contained within the outline of the shroud, said outwardly extending wall provided with an opening extending therethrough and adapted to face the power gear teeth, a shift member splined to the shaft and provided with teeth adapted in its movement in one direction successively to cause the friction clutch to become operative and then to pass through the opening in the ring and into mesh with the teeth on the gear and thus provide a positive drive between the power gear and the shaft through said shift member.

3. In a device of the class described, the combination of two elements of a positive driving dental clutch, one shiftable relative to the other, synchronizing means for causing them to approach the same speed, said means including a friction clutch disposed between the positive clutch elements with one of its elements shiftable, including a part disposed in the path of movement of one of the positive clutch elements and adapted to be engaged thereby and shifted thereby into its frictional clutching position, said shiftable element of the friction clutch constituting a light weight ring constructed to have low momentum when rotating, a bearing therefor positioned exteriorly of the path of movement of the shiftable dental clutch element and camming means exteriorly of said bearing for increasing the clutching engagement of the elements of the friction clutch.

4. In a device of the class described, the combination of a shaft, a member constituting an element of a positive clutch mounted for rotary movement about the axis of the shaft, synchronizing means including a friction clutch for causing the shaft and positive clutch element to approach the same speed, said member provided with the coacting element of the friction clutch, said synchronizing means including a bearing element mounted on the shaft and provided with an opening extending therethrough, a ring constituting a shiftable element of the friction clutch mounted on and encircling said bearing element and having a slight freedom of rotary and axial movement relative thereto, camming means operable automatically with the relative rotary movement to shift the same axially, and a coacting positive clutch forming element splined to the shaft to turn therewith and shiftable thereon to engage and shift the shiftable friction clutch element into its initial operative position and thus cause the camming means to function and to pass through the opening in the bearing element to engage the first named positive clutch element.

5. In a device of the class described, the combination of a shaft, a member provided with an element of a positive clutch and with an element of a friction clutch, a control member splined to the shaft to turn therewith slidable thereon and provided with the coacting element of the positive clutch, mechanism for causing the positive clutch elements to approach the same speed before they are moved into their positive clutching relation, said mechanism including two telescoped members rotatably mounted one on the other, with the inner member secured to the shaft to turn therewith and the outer member provided with the coacting element of the friction clutch, the outer of said telescoped members provided with a deterrent spring disposed in the path of movement of the control member and shifted thereby to cause the friction clutch to become operative prior to the movement of the positive clutch elements into their clutching position.

6. In a device of the class described, the combination of a shaft, a member provided with an element of a positive clutch and with an element of a friction clutch, a control member splined to the shaft to turn therewith slidable thereon and provided with the coacting element of the positive clutch, mechanism for causing the positive clutch elements to approach the same speed before they are moved into their positive clutching relation, said mechanism including two telescoped members rotatably mounted one on the other, with the inner member secured to the shaft to turn therewith and the outer member provided with the coacting element of the friction clutch, the outer member provided with an extension projecting inwardly therefrom towards the shaft disposed in the path of movement of the control member and shifted thereby to cause the friction clutch to become operative prior to the movement of the positive clutch elements into their clutching position, and camming means spaced from the shaft, operable between said two telescoped members and actuated from the momentum of the parts to be synchronized and operatively responsive to the movement of the friction clutch elements into their clutching position for increasing the intensity of the clutching action of the friction clutch.

7. In a device of the class described, the combination of means providing a positive clutch drive, mechanism for causing the elements of the positive clutch drive to approach the same speed, said mechanism including a friction clutch drive between said elements, said friction clutch drive including a slidable element adapted to rotate at high speed when the friction clutch is operatively disposed, and a shroud distinct from said clutch drives encircling the outer periphery of said shiftable clutch element and tending to defeat oil or other surrounding medium from imposing a drag on the high speed rotary movement of the shiftable friction clutch element, said shroud being relatively frail and not capable of transmitting the heavy rotary torque forces for which the positive clutch and friction clutch drives were designed to transmit.

8. In a device of the class described, the combination of a shaft, a positive clutch element mounted for rotary movement about the axis of the shaft, a friction clutch including an element carried by said positive clutch element, a bearing ring carried by the shaft, a synchronizer ring journalled on the bearing ring and provided with the coacting element of the friction clutch, said bearing ring provided with a shroud for encircling and protecting said coacting element of the friction clutch from the drag of oil or other medium in which it may be turning, and said shroud being remote from the portion of the mounting ring which transmits torque through the friction clutch.

9. In a device of the class described, the combination of means providing a positive clutch drive, mechanism for causing the elements of the positive clutch drive to approach the same speed, said mechanism including a friction clutch drive between said elements, said friction clutch drive including a shiftable element adapted to rotate at high speed when the friction clutch is operatively disposed, and a shroud distinct from said clutch drives encircling the outer periphery of said shiftable clutch element and tending to defeat oil or other surrounding medium from imposing a drag on the high speed rotary movement of the shiftable friction clutch element.

10. In a device of the class described, the combination of a shaft, a friction clutch including an element mounted for rotary movement about the axis of the shaft, a bearing carried by the shaft and fixed thereto to turn therewith, a ring constituting the coacting element of the clutch carried by the bearing and having a slight freedom of axial and rotative movement thereon, and a shroud carried by the bearing and acting to enclose substantially the coacting element of the friction clutch, thereby tending to defeat the action of external agencies which may tend to retard the rotary movement of the clutch element.

11. In a device of the class described, the combination of the two elements of a friction clutch of the cone type and mounted for rotary movement, a shroud encircling the outer of said two elements bodily rotatable therewith and capable of a slight relative rotary movement, said shroud acting to protect the same from the drag of oil or other medium in which the clutch may be rotating.

12. In a device of the class described, the combination of a positive drive clutch, mechanism for synchronizing the speed of the elements of the clutch, said mechanism including a cone-type friction clutch with one of its elements in the form of a hollow frusto-conical ring, having a mounting hub at its smaller end, the inner periphery of said hub provided with a groove, a deterrent spring mounted in said groove and projecting inwardly therefrom, a support for said element on which the hub is mounted for axial movement, and control means engaging the deterrent spring for shifting said element on said support and into its clutching position.

13. In a device of the class described, the combination of a positive drive clutch, mechanism for causing the elements of the clutch to approach the same speed, said mechanism including a friction clutch with one of its elements in the form of a light hollow ring shiftable to and from its operative position, said ring having a relatively small diametrical dimension compared with its diameter, an annular support of relatively large diameter for said element, and camming means adjacent the outer periphery of said support and operable between the support and said element for shifting said element into its clutching position.

14. In a device of the class described, the combination of a positive drive clutch, mechanism for causing the elements of the clutch to approach the same speed, said mechanism including a friction clutch with its shiftable element normally free to move slightly in two directions, one being its direction of movement into its clutching relation with its coacting element, a structure including a support for said shiftable element, and said structure and shiftable element provided with camming means operable automatically by the movement of the shiftable element relative to the support in the other direction for causing said element to bear on its coacting clutch element, and control means encircled by the shiftable element and its support for shifting the clutch element towards its coacting element and for causing said camming means to function.

15. In a device of the class described, the combination of a rotative positive drive clutch, mechanism for causing the elements of the clutch to approach the same speed, said mechanism including a friction clutch having a shiftable element which may be contained in a pool of oil or other medium having a tendency to impose a drag on the rotative movement of said shiftable element, and a shroud turning with one of the rotary elements of the positive drive clutch and disposed substantially to enclose the shiftable element of the friction clutch.

16. In a device of the class described, the combination of a positive drive clutch, mechanism for causing the elements of the clutch to approach the same speed, said mechanism including a friction clutch positioned externally of and encircling the positive drive clutch, a support for the shiftable element of the friction clutch, said support provided with an opening and the shiftable element provided with an extension projecting into the opening, the projection and opening provided with means coacting to provide a cam for causing the shiftable element to bear on its coacting friction clutch element.

17. In a device of the class described, the combination of a shaft, a positive clutch element free to turn about the axis of the shaft, a coacting positive clutch element splined to the shaft and shiftable to and from a positive drive relation with the first named element, a supporting member secured to the shaft to turn therewith, mechanism including a friction clutch for causing the positive clutch elements to approach the same speed, said friction clutch including a shiftable element carried by said supporting member encircling and in spaced relation to the shaft and provided with a part projecting therefrom towards the shaft in the path of the coacting element splined to the shaft and operably disposed to be moved into its clutching position as said element splined to the shaft is moved towards its position engaging the first named positive clutch element, and camming means operable between the shiftable friction clutch element and its supporting member for causing the friction clutch to function with a force proportionate to the difference in momentum between the support with its shaft and the engaged elements of the friction clutch.

18. In a device of the class described, the combination of a positive drive clutch, two rotative annular elements, coacting to form a friction clutch, one of said elements secured to one of the positive drive clutch elements and the other friction clutch element movable axially of its axis of rotation to and from its friction clutching position, camming means operable incidental to a relative rotary movement of the friction clutch elements when in clutching engagement to cause an increase in intensity of the clutching engagement of the elements, said camming means disposed remote from the axis of rotation to minimize the torque force transmitted therethrough, and said camming means disposed relatively close to the interengaging clutching surfaces of the elements.

19. In a device of the class described, the combination of a shaft, a supporting member carried by the shaft and provided with a bearing encircling and spaced from the shaft, and a friction clutch including a shiftable element mounted on the bearing and normally disposed in position fixed relative to said supporting member, camming means between the shiftable element and said member tending to move the shiftable element in its operative clutching direction, and spring actuated centering means between the shiftable element and said supporting member tending to restore the shiftable element to its normal position when free of its engagement with its coacting clutch element.

20. In a device of the class described, a unit adapted to be installed in a change-speed gear transmission of a positive drive type, said unit comprising a mounting ring provided with an opening extending therethrough and constituting an element of a camming device, a synchronizing friction clutch element provided with a cam contained in said opening and constituting the coacting element of said camming device and resilient means for centering the cam in the opening.

21. In a device of the class described a unit adapted to be installed in a change-speed gear transmission, said unit comprising a mounting ring provided with an element of a camming device, a synchronizing friction clutch element provided with the coacting element of said camming device and a deterrent spring carried by the clutch element and extending through a part of the mounting ring.

22. In a device of the class described, the combination of means providing a positive clutch drive, mechanism for causing the elements of the positive clutch drive to approach a common speed, said mechanism including a friction clutch between said elements, said friction clutch including an element slidable to and from its friction clutching position, a shroud encircling the outer periphery of said shiftable clutch element, and camming means between the shroud and shiftable element operably dependent upon relative rotary movement between the shroud and shiftable element to cause an increase in clutching effect of the friction clutch.

23. In a device of the class described, the combination of a shaft, a power member mounted for rotary movement about the axis of the shaft and provided with an element of a positive clutch and with an element of a conical friction clutch, a coacting element of the positive clutch connected to the shaft to turn therewith and movable axially relative to the shaft to and from its engagement with its companion thereby to positively connect the shaft and power member, means for connecting the shaft and power member frictionally, said means including a coacting friction clutch element having axial movement relative to its companion and having a limited freedom of rotary movement relative to the shaft, said coacting friction clutch element constituting an annular ring comprising an outer conical flange and a web portion disposed in a plane at right angles to the shaft, means encircling the shaft and providing a bearing for the inner periphery of said web portion and camming means at said web portion operatively responsive to relative rotary movement between the coacting friction clutch element and the camming means for forcing the ring into engagement with the conical friction clutch on the power member.

24. In a device of the class described, the combination of two members mounted for rotary movement about a common axis, one of said members provided with an element of a conical friction clutch, and the other member providing a ring support, a ring formed of two angularly disposed flanges with one flange carried by said support and the other flange constituting the coacting element of the friction clutch and said ring support including means providing a shroud for the flange which forms the coacting clutch element.

25. In a device of the class described, the combination of a spline shaft, a power member mounted for rotary movement about the axis of the shaft and provided with an element of a friction clutch, a mounting member keyed to the shaft to turn therewith, a coacting friction clutch element carried by said mounting member to turn therewith and having a limited axial movement into clutching engagement with its companion and having a limited rotary movement relative to said mounting member and camming means between said coacting clutch element and said mounting member operatively responsive to said limited rotary movement for shifting said coacting element axially into its clutching engagement.

HOWARD J. MURRAY.